Figure 1:
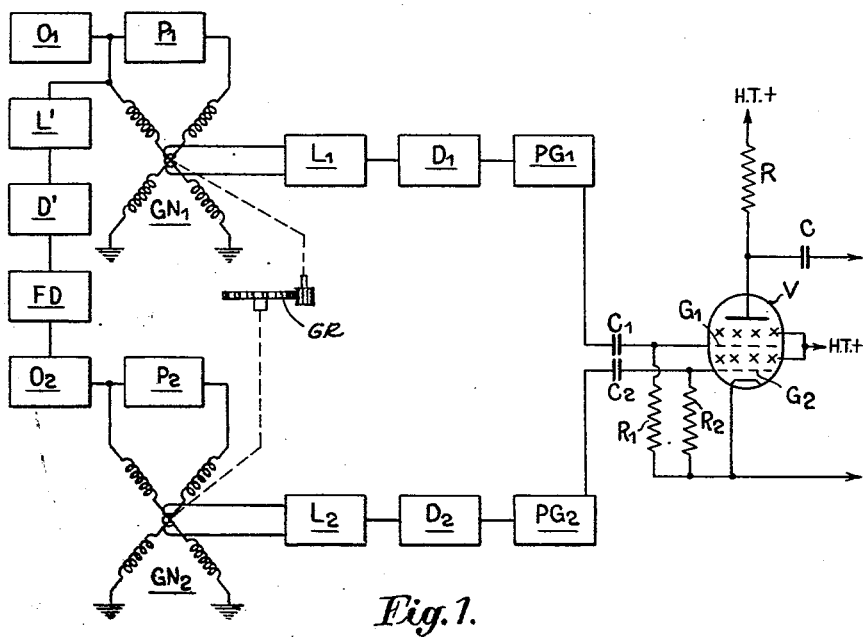

Aug. 31, 1954

E. L. C. WHITE ET AL 2,688,077

METHOD AND APPARATUS FOR THE CONTROL
OF THE TIMING OF RECURRENT SIGNALS

Filed Jan. 11, 1946

2 Sheets-Sheet 1

INVENTORS
A. D. BLUMLEIN, DEC'D
BY DOREEN WALKER, EX'TRIX.
AND E. L. C. WHITE

INVENTORS
A. D. BLUMLEIN, DEC'D.
BY DOREEN WALKER, EX'TRIX.
AND E. L. C. WHITE

BY H.G. Grover
ATTORNEY

Patented Aug. 31, 1954

2,688,077

UNITED STATES PATENT OFFICE 2,688,077

METHOD AND APPARATUS FOR THE CONTROL OF THE TIMING OF RECURRENT SIGNALS

Eric Lawrence Casling White, Iver, England, and Alan Dower Blumlein, deceased, late of Ealing, London, England, by Doreen Walker, executrix, Lanherne, Lescudjack, Penzance, Cornwall, England, assignors to Electric & Musical Industries Limited, Hayes, Middlesex, England, a company of Great Britain Application January 11, 1946, Serial No. 640,596
In Great Britain December 13, 1939

Section 1, Public Law 690, August 8, 1946
Patent expires December 13, 1959

12 Claims. (Cl. 250—27)

This invention relates to apparatus for the control of the timing of recurrent signals.

Methods are already known by which the phase of electrical signals may be adjusted, for example, by rotating the moving coil of a goniometer of which the two fixed pairs of coils are fed with the signal in quadrature. In such arrangements, the phase of signals obtained from the moving coil of the goniometer will be determined by the angular position of this coil. Although the angular position of the coil may be accurately measured by gearing the motion of the coil to an indicating device, trains of gearing have backlash which limit the final accuracy obtainable. Further, the phase of the signals may not be directly proportional to the angular position of the coil due to imperfections in the goniometer. Such methods therefore require apparatus of very careful design and construction to enable the phase of the signals to be adjusted with accuracy.

It is an object of this invention to provide improved apparatus of relatively simple design and construction for the accurate control of the timing of recurrent electrical pulses.

Broadly, according to the present invention, apparatus for generating a series of electrical pulses of adjustable timing includes means providing a plurality of series of signals, the signals in each series being recurrent at a frequency which is an integral multiple of the frequency of the signals in the next series of lower frequency and having a duration which is shorter than that of the signals in said next series, the lowest frequency being that of the pulses which it is desired to generate, means arranged to generate an output pulse only when signals from each of said series are simultaneously applied to said means and means for controlling the timing of said series of signals in such a manner that whenever a signal of the lowest frequency is applied to said generating means, an appropriate signal from each other series of signals, depending on the relative frequency of said series of signals, is simultaneously applied to said generating means whereby the timing of the generated pulses is determined by the timing of the series of signals of highest frequency so that the timing of the generated pulses may be adjusted to the same accuracy as that of said signals of highest frequency.

In the case in which two series of signals are employed, apparatus according to the invention includes a first source providing a first series of signals recurrent at a frequency $f$, means for controlling the timing of said series of signals, a second source providing a second series of signals of shorter duration and recurrent at a frequency $nf$, where $n$ is an integer, means for controlling the timing of said second series of signals, a device arranged to generate an output pulse only when signals of said first and second series are fed to it simultaneously, said first and second controlling means being so inter-connected that every $n$th signal of said second series is always fed to said device during a signal of the first series, whereby the timing of the generated pulses is determined by the timing of said second series of signals so that the timing of the generated pulses may be adjusted to the same accuracy as said second series of signals.

Preferably, where three series of signals are employed apparatus according to the invention comprises a source providing a third series of signals of shorter duration than said second series of signals and recurrent at a frequency $mnf$, where $m$ is an integer, means for controlling the timing of said third series of signals, a second device arranged to provide an output only when the output from said first mentioned device and said third series of signals are fed to it simultaneously, said third controlling means being interconnected with said first and second controlling means, so that every $n$th signal of said third series occurs during a signal of said second series, whereby the timing of the generated pulses may be adjusted to the same accuracy as the timing of said third series of signals.

The signals of frequency $nf$ or $nmf$ may be provided by an oscillation generator and one or more frequency dividers are arranged to provide the signals of frequency $f$ or $nf$ and $f$ respectively.

In particular forms of apparatus embodying the invention the means for controlling the timing of the series of signals includes an angularly adjustable element, so arranged that the timing of said signals is linearly related to the angular rotation of said element and one of said elements is coupled to another of said elements which controls the timing of a series of signals of lower frequency by reduction gearing of predetermined ratio, so that when said elements are adjusted a signal of the series of higher frequency always occurs during a signal of the series of lower frequency. Particular forms of means for controlling the timing of the signals may consist of one or more goniometers, one or more delay networks having variable tappings to permit adjustment of the timing of signals applied to them, capacitatively coupled goniometers or a saw-tooth voltage waveform generator the frequency of which is controlled by pulses and a valve to which the saw-tooth waveform is applied, an angularly adjustable member serving to control a bias potential which is applied to the valve so as to control the timing at which the saw-tooth waveform causes the valve to conduct to produce an output.

The means arranged to generate an output pulse or the device or second device to which the separate series of signals are applied may consist of a thermionic valve having two control electrodes to each of which a series of signals of different frequency is fed, said valve being so arranged as only to give an output when signals are simultaneously applied to both of said grids.

Figure 2:
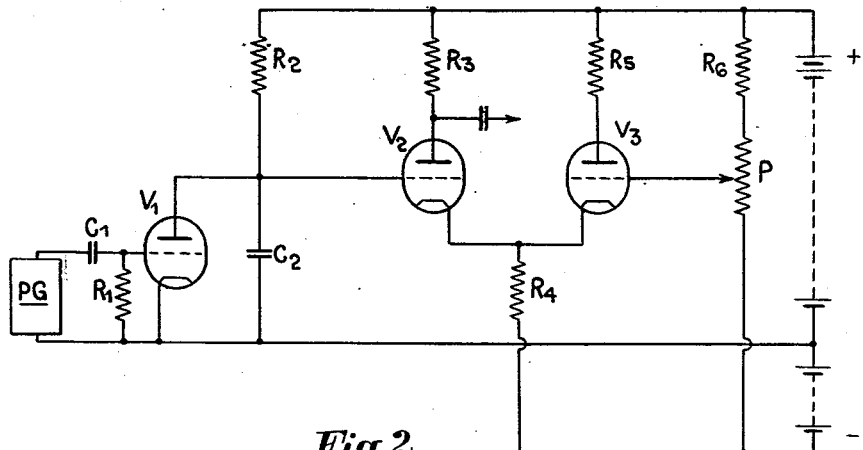
Figure 3:
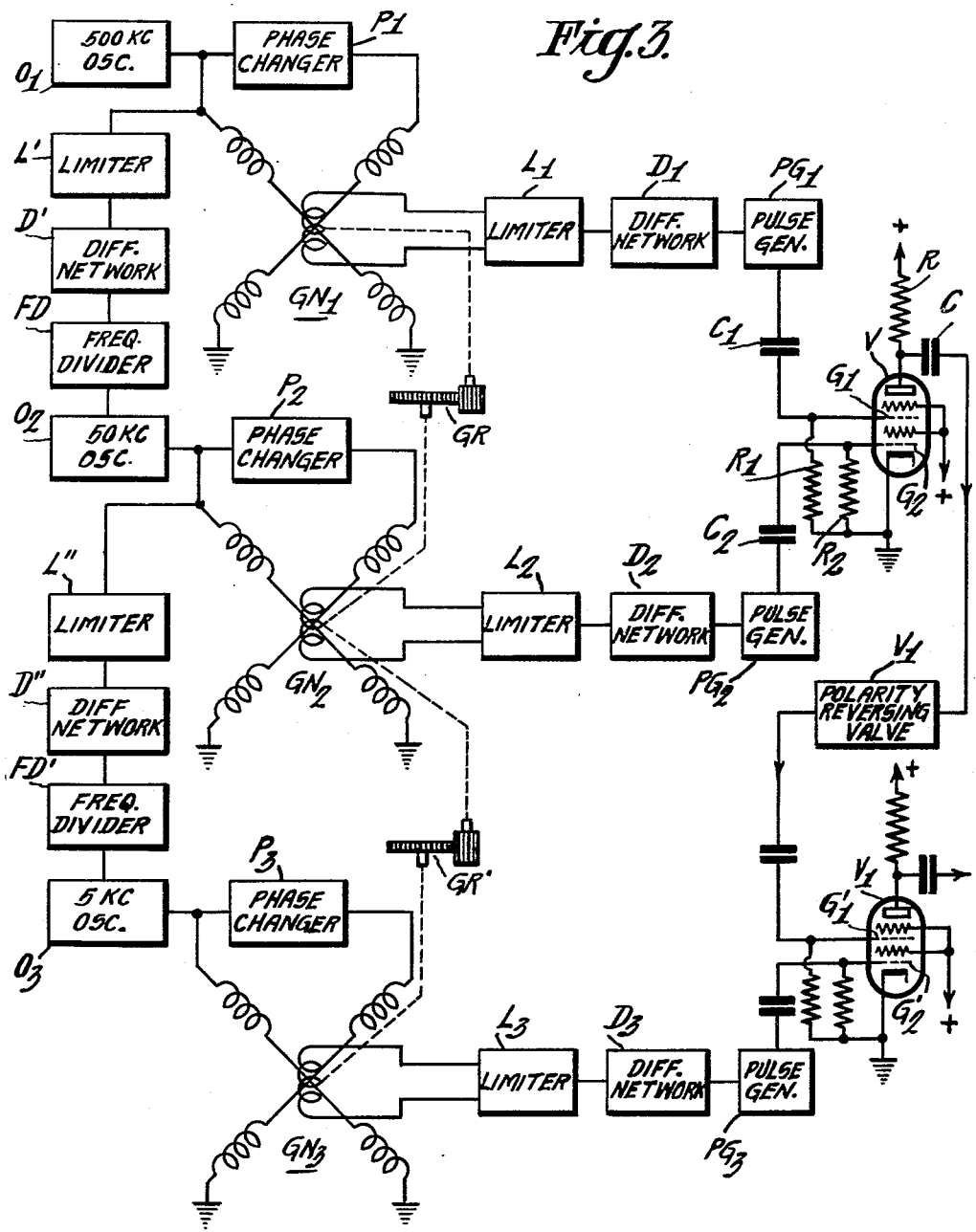

In order that the invention may be more clearly understood and readily carried into effect, alternative forms of pulse timing circuit arrangements will now be described in greater detail by way of example with reference to the accompanying drawings, in which:

Figure 1 shows a general schematic circuit diagram of an arrangement for the accurate control of the timing of pulses by means of goniometers, Figure 2 shows a circuit diagram of an alternative pulse generator of adjustable timing, and Figure 3 shows a schematic circuit diagram of an arrangement using three goniometers for increased accuracy.

Referring to Figure 1, it will be seen that the circuit comprises a valve V, from the anode circuit of which recurrent pulses are obtained, and the goniometers $GN_1$, $GN_2$ which control the timing of these pulses by controlling the timing of a first series of pulses of frequency $f$ and the second series of pulses of frequency $nf$ derived from the oscillators $O_2$ and $O_1$ respectively in a manner which will hereinafter be described.

It will be assumed that the oscillator $O_1$ is an oscillator generating sinusoidal oscillations at 50,000 cycles/sec. The output from the oscillator $O_1$ is fed to one pair of coils of the goniometer $GN_1$ and is also fed via a phase-changing device $P_1$ of known type which rotates the phase of the oscillations by 90° to the other pair of coils of the goniometer $GN_1$. The output from the moving coil of $GN_1$ is fed to the limiting device $L_1$, which converts the sinusoidal oscillations into an oscillation of substantially rectangular waveform $L_1$ and may conveniently take the form of a thermionic valve amplifier adjusted in well known manner to limit both positive and negative amplitudes of the applied oscillations. The output from $L_1$ is applied to the differentiating network $D_1$ of known type, which may, for example, comprise a condenser in series with a resistance, which converts the limited sinusoidal oscillations into a series of sharp impulses of relatively short duration. These impulses may be utilised directly, or may be fed to a pulse generator $PG_1$, which may be a multivibrator of known type, to cause it to generate pulses of short duration at the frequency of the oscillator $O_1$, these pulses of short duration being the second series of pulses of frequency $nf$ referred to above. The pulses thus generated by the pulse generator $PG_1$ are fed in the positive sense to the grid $G_1$ of the hexode valve V over an A. C. coupling comprising a condenser $C_1$ and leak $R_1$ the grid $G_1$ being biased beyond anode current cut-off except when a pulse from the pulse generator $PG_1$ is applied thereto.

The oscillations from the oscillator $O_1$ are also fed via a limiter $L'$ and a differentiating network $D'$ similar to the limiter $L_1$ and the differentiating network $D_1$ respectively to a frequency divider FD of known type, which may be of the kind described in British patent specification No. 471,731. The frequency divider FD is arranged to deliver pulses of a frequency of $\frac{1}{10}$ of that of the oscillator $O_1$, namely, 5000 cycles/sec. and these pulses are applied to control a device $O_2$, which may be a tuned circuit or a band-pass filter, so as to provide a sinusoidal output having a frequency of 5000 cycles/sec.

The sinusoidal oscillations from the device $O_2$ are then treated in the manner which has previously been described with reference to the oscillator $O_1$. They are fed in quadrature to the coils of the goniometer $GN_2$, and the output from the moving coil of this goniometer is fed via the limiter $L_2$ and the differentiating network $D_2$ which corresponds to the limiter $L_1$ and the differentiating network $D_1$ to the pulse generator $PG_2$ and thence to the control electrode $G_2$ of the valve V over the grid condenser $C_2$ and its associated leak $R_2$. The pulse generator $PG_2$ is, however, arranged to provide pulses longer in duration than those provided by the pulse generator $PG_1$ and these pulses constitute the first series of pulses of frequency $f$ referred to above. The control grid $G_2$ is arranged to be normally biased beyond anode current cut-off so that the valve V can only pass current when pulses from the pulse generator $PG_2$ are present.

The valve V is provided with two further electrodes which are connected to steady positive potentials so as to enable them to serve as screening electrodes, and its anode circuit is provided with an output load R. In operation, it is arranged that a voltage is set up across the load R only when pulses are simultaneously present on the control electrodes $G_1$ and $G_2$, and the voltages thus set up constitute the series of pulses the timing of which is to be controlled and may be fed to a utilisation circuit through a blocking condenser C.

The fixed coils of the goniometers $GN_1$ and $GN_2$ are adjusted so that whenever a pluse from the pulse generator $PG_2$ is applied to the control electrode $G_2$, a pulse from the pulse generator $PG_1$ is also applied to the control electrode $G_1$ at approximately the mean or average timing of the pulse from the pulse generator $PG_2$. The duration of the pulse from the pulse generator $PG_2$ is arranged to be nearly equal to the time interval between successive pulses from the pulse generator $PG_1$, so that the maximum error in timing of the pulses from the pulse generator $PG_2$ may be tolerated whilst still ensuring that these pulses shall coincide in a particular case only with every 10th pulse from the pulse generator $PG_1$. The output from the anode circuit of the valve V will therefore be a series of pulses having the duration of the pulses from the pulse generator $PG_1$ but recurrent at the frequency of the pulses from the pulse generator $PG_2$.

The adjustment of the timing of the pulses in the output circuit of the valve V will now be described. This adjustment is effected by rotating the moving coil of the goniometer $GN_1$ and simultaneously rotating the moving coil of the goniometer $GN_2$ so as to maintain the timing of the pulses delivered by the pulse generators $PG_1$ and $PG_2$ within the tolerance permitted by the difference in duration of these pulses, i. e., within approximately the time interval between successive pulses from the pulse generator $PG_1$, so as to ensure that no "slipping" can occur due to a pulse other than every successive pulse selected from the pulses provided by the pulse generator $PG_1$. The moving coil of the goniometer $GN_2$, in the particular case under consideration may conveniently be driven from the moving coil of the goniometer $GN_1$ by a 10:1 reduction gearing indicated at GR, and in view of the relatively large permissible tolerance in the timing of the pulses derived from the goniometer $GN_2$, it will be appreciated that this gearing need not be highly accurate, but may be relatively cheap, since the presence of considerable backlash may be permitted. Further, the effect of departure of the phase angle of the output of the goniometer $GN_1$ from a strictly linear relation to the angle of rotation of the moving coil will be greatly reduced so far as the timing of the output pulses from V are concerned. It will thus be seen that the timing of the 5000 cycles/sec., pulses from V may be adjusted with an accuracy equal to that obtainable for the pulses of 50,000 cycles/sec., i. e., the accuracy of timing adjustment has been increased approximately tenfold by a method which does not require precision gearing or goniometers of highly accurate design.

The method which has been described may be applied two or more times so as to gather further increased accuracy of timing adjustment. Thus, if the frequency of the required pulses is 5000 cycles/sec. an oscillator having a frequency of 500,000 cycles/sec. may be provided, and successively divided to give oscillations at frequencies of 50,000 cycles/sec. and 5,000 cycles/sec. respectively. These three oscillations may then be applied in quadrature to the fixed coils of three goniometers $GN_1$, $GN_2$ and $GN_3$ as shown in Fig. 3 and the moving coils of these goniometers coupled together in succession over 10:1 reduction gearing GR and GR′ so that an angular movement of 100° of the moving coil of the goniometer fed with the 500,000 cycles/sec. oscillation causes an angular movement of 10° of the moving coil of the goniometer fed with the 50,000 cycles/sec. oscillation which in turn causes an angular movement of 1° of the moving coil of the third goniometer. The outputs from the moving coils of the first two goniometers are then treated in the same manner as that described above with reference to the goniometers $GN_1$ and $GN_2$, and the output from a hexode valve V is then fed via an amplifying valve V′ which reverses its polarity, to one of the control electrodes $G_1'$ of another hexode valve $V_1$ similarly arranged, to the other control electrode $G_2'$ of which the pulses derived from the third goniometer $GN_3$ are applied after passing through further devices $L_3$, $D_3$ and $PG_3$ corresponding to the limiter $L_1$, the differentiating network $D_1$ and the pulse generator $PG_1$, respectively. The pulses derived from the output circuit of this further hexode $V_1$ will thus have the duration of the highest frequency pulses, but will recur at the lowest frequency, i. e., 5000 cycles/sec. and the accuracy with which their timing may be adjusted will be the accuracy with which the highest frequency pulses may be adjusted. In other words, the accuracy of timing has been increased approximately 100 times. The limiter L″, the differentiating network D″, the frequency divider FD′, the oscillator $O_3$, and the phase changing device $P_3$ correspond to the units L′, D′, FD, $O_2$ and $P_2$, respectively.

The inductive goniometers, which have been referred to in the preceding description, may be replaced by capacity goniometers of known type having two pairs of fixed plates arranged in the manner of a quadrant electrometer so as to enclose a circular output electrode. A screening electrode is arranged to rotate between said circular electrode and said pairs of fixed plates so as to vary the direct capacity between each pair of fixed plates and said circular plate, and the phase of the signals derived from said circular electrode is then determined by the angular position of said screening electrode.

Alternatively, said goniometers may be replaced by time delay networks giving delay equal to the periodic time of the pulses of which the timing is to be adjusted. Such networks are preferably folded or looped so as to bring their ends adjacent each other, and are terminated so as to prevent reflections. The timing of the pulses is adjusted by rotating an arm carrying a pick-up electrode so that it either makes contact or has capacity to different points in the network in turn. By folding the network so as to make it of substantially circular form and to bring its ends adjacent to each other, the pick-up electrode may be rotated beyond 360° and the timing of the pulses made proportional to the angular rotation of the arm carrying the pick-up electrode. If the frequency of the pulses is sufficiently high to permit capacitative pick-up, a second time-delay network similar to that which has been described may be set up so as to be rotatable with reference to it, so that any given point in the second delay network is capacitatively coupled with successive points in the first delay network as the two networks are rotated with respect to each other. The timing of the pulses delivered at the ends of the second delay network will then depend upon the relative angular position of the time networks, and may be continuously adjusted by rotating the two networks with respect to each other.

It will be appreciated that it is unnecessary to employ sinusoidal oscillations when time delay networks are used instead of goniometers, since the former are suitable for controlling the timing of pulses whereas the latter can only be used satisfactorily with sinusoidal oscillations. Thus, if time delay networks are used, the limiters and differentiating networks L′, D′, $L_1$, $D_1$, etc., are not required, and the oscillators $O_1$, $O_2$, etc., take the form of pulse generators.

A further alternative to the above-mentioned goniometers and time delay networks will now be described with reference to Figure 2 of the accompanying drawings. The pulse generator PG supplies the pulses, the timing of which is to be controlled, to the control electrode of the valve $V_1$ over a condenser $C_1$ and leak $R_1$, which are arranged so that the grid current drawn by the pulses biases the valve $V_1$ beyond anode current cut-off except when pulses are present. The valve $V_1$ is thus normally insulating, but is rendered conductive whenever a pulse is applied to its control electrode. The anode/cathode path of the valve $V_1$ is connected in parallel with the condenser $C_2$, which is connected in series with resistance $R_2$ across a source of voltage as shown. Current flows from this source of voltage through the resistance $R_2$ to charge the condenser $C_2$ until the valve $V_1$ is rendered conductive by a pulse from the pulse generator PG, when the condenser $C_2$ is discharged through the valve $V_1$. On the termination of the pulse from the pulse generator PG the valve V₁ becomes non-conducting and the condenser again commences to charge and so the cycle repeats itself. The voltage set up across the condenser C₂ is thus of approximately saw-tooth form and has a frequency equal to that of the pulses from the pulse generator PG. The voltage set up across the condenser C₂ is applied to the control electrode of a valve V₂, which has a resistance R₃ in its anode circuit and a resistance R₄ in its cathode circuit. A further valve V₃ also shares the cathode resistance R₄ and has a resistance R₅ in its anode circuit. The control electrode of V₃ is connected to a sliding contact on a potentiometer P connected in series with a fixed resistance R₆ across a source of voltage as shown. As the voltage across the condenser C₂ increases, the current in the anode circuit of both valves V₂ and V₃ will change and when the voltage on the control electrode of the valve V₂ exceeds that on the control electrode of valve V₃, the current in the valve V₃ will decrease. When the condenser C₂ is discharged by the valve V₁, an equal and opposite change in these currents will take place. By feeding the voltage set up across either the resistance R₃ or R₅ to a differentiating network, a series of pulses may be obtained having the same frequency as the pulses delivered by the pulse generator PG but having a timing dependent upon the position of the slider of the potentiometer P. The pulses thus derived from the resistance R₃ or R₅ may control a further pulse generator giving pulses of any desired duration and may then be applied to one of the control electrodes of a hexode mixer of the type described with reference to Figure 1 of the accompanying drawings.

In order to enable the timing of the pulses derived from the arrangement shown in Figure 2 to be controlled simultaneously with that of other pulse generators the slider of the potentiometer P may be mechanically coupled either to the sliders of other potentiometers controlling the other pulse generators or to the moving coil of a goniometer or to the rotating pick-up element of a time delay network. As the condenser C₂ will charge exponentially, the potentiometer P is preferably given an exponential law so that the timing of the pulses may have a linear relation to the movement of the slider of this potentiometer. Alternatively, the condenser C₂ may be arranged to charge linearly by connecting a large choke in series with the resistance R₂ in which case the potentiometer may have a linear law. Generally speaking, the pulse generator shown in Figure 2 is convenient for the low frequency pulse, and goniometers or time delay networks are more suitable for the higher frequency pulses, the timing of which has to be capable of continuous adjustment through many cycles, thus requiring more than 360° of rotation of the timing adjustment.

What we claim is:

1. Apparatus for generating a series of electrical pulses of adjustable timing including means providing a plurality of series of signals, the signals in each series being recurrent at a frequency which is an integral multiple of the frequency of the signals in the next series of lower frequency and having a duration which is shorter than that of the signals in said next series, the lowest frequency being that of the pulses which it is desired to generate, means arranged to generate an output pulse only when signals from each of said series are simultaneously applied to said means and means for so controlling the timing of said series of signals that whenever a signal of the lowest frequency is applied to said generating means, an appropriate signal from each other series of signals, depending on the relative frequency of said series of signals, is simultaneously applied to said generating means whereby the timing of the generated pulses is determined by the timing of the series of signals of highest frequency so that the timing of the generated pulses may be adjusted to the same accuracy as that of said signals of highest frequency, said means for controlling the timing comprising a plurality of phase shifters, there being a separate phase shifter for each series of signals.

2. Apparatus for generating a series of electrical pulses of adjustable timing, including a first source providing a first series of signals recurrent at a frequency $f$, means for controlling the timing of said series of signals, a second source providing a second series of signals of shorter duration and recurrent at a frequency $nf$, where $n$ is an integer, separate means for controlling the timing of said second series of signals, a device arranged to generate an output pulse only when signals of said first and second series are fed to it simultaneously, said first and second controlling means being so inter-connected that every $n$th signal of said second series is always fed to said device during a signal of the first series, whereby the timing of the generated pulses is determined by the timing of said second series of signals so that the timing of the generated pulses may be adjusted to the same accuracy as that of said second series of signals.

3. A modification of the apparatus according to claim 2 comprising a source providing a third series of signals of shorter duration than said second series of signals and recurrent at a frequency $mnf$, where $m$ is an integer, means for controlling the timing of said third series of signals, a second device arranged to provide an output only when the output from said first mentioned device and said third series of signals are fed to it simultaneously, said third controlling means being interconnected with said first and second controlling means, so that every $m$th signal of said third series occurs during a signal of said second series, whereby the timing of the generated pulses may be adjusted to the same accuracy as the timing of said third series of signals.

4. Apparatus according to claim 2 wherein each of said means for controlling the timing of said series of signals includes an angularly adjustable element so arranged that the timing of said signals is linearly related to the angular rotation of said element and one of said elements is coupled to another of said elements, which controls the timing of a series of signals of lower frequency by reduction gearing of predetermined ratio, so that when said elements are adjusted a signal of the series of higher frequency always occurs during a signal of the series of lower frequency.

5. Apparatus according to claim 4 in which at least one of said means for controlling the timing of said signals includes a goniometer arranged so that one of said sources feeds signals in quadrature to the two pairs of the fixed elements thereof, resultant signals being derived from the rotatable element thereof which constitutes said angularly adjustable element.

6. In a phase shifting system, means for producing a first electrical wave that periodically exceeds a predetermined voltage at a frequency rate $f$, means for producing a second electrical wave that periodically exceeds a predetermined voltage at a frequency that is a submultiple of said frequency $f$, means comprising a phase shifter for shifting the phase of said first electrical wave, means comprising a second phase shifter for shifting the phase of said second electrical wave, pulse selector means for passing a signal only in response to the application of at least two electrical waves and only when said waves simultaneously exceed a predetermined voltage, and means for applying said first and second electrical waves to said pulse selector means whereby a periodic pulse of at least approximately the desired phase or timing may be selected from said first wave by adjusting the phase of said second wave.

7. Apparatus for generating a series of electrical pulses of adjustable timing including means providing a plurality of series of signals, the signals in each series being recurrent at a frequency which is an integral multiple of the frequency of the signals in the next series of lower frequency and having a duration which is shorter than that of the signals in said next series, the lowest frequency being that of the pulses which it is desired to generate, means arranged to generate an output pulse only when signals from each of said series are simultaneously applied to said means, and means for controlling the timing of said series of signals in such a manner that whenever a signal of the lowest frequency is applied to said generating means, an appropriate signal from each other series of signals, depending on the relative frequency of said series of signals, is simultaneously applied to said generating means whereby the timing of the generated pulses is determined by the timing of the series of signals of highest frequency so that the timing of the generated pulses may be adjusted to the same accuracy as that of said signals of highest frequency, wherein each of said means for controlling the timing of said series of signals includes an angularly adjustable element, and wherein one of said elements is coupled to another of said elements which controls the timing of a series of signals of lower frequency by reduction gearing of predetermined ratio, so that when said elements are adjusted a signal of the series of higher frequency always occurs during a signal of the series of lower frequency.

8. In a phase shifting system, means for producing a first electrical wave that periodically exceeds a predetermined voltage at a frequency rate $f$, means for producing a second electrical wave that periodically exceeds a predetermined voltage at a frequency that is a submultiple of said frequency $f$, means comprising a goniometer phase shifter for shifting the phase of said first electrical wave, means comprising a second goniometer phase shifter for shifting the phase of said second electrical wave, pulse selector means for passing a signal only in response to the application of at least two electrical waves and only when said waves simultaneously exceed a predetermined voltage, and means for applying said first and second electrical waves to said pulse selector means whereby a periodic pulse of at least approximately the desired phase or timing may be selected from said first wave by adjusting the phase of said second wave.

9. Apparatus for producing a periodically recurring electrical pulse that is adjustable in phase or timing, said apparatus comprising a generator for producing a periodic electrical wave, a phase shifter through which said wave is passed to produce a periodic electrical wave that is adjustable in phase or timing, frequency divider means for producing a second periodic electrical wave having a frequency that is a submultiple of the frequency of said first wave, said frequency divider means being connected to receive said first wave from said generator whereby it is locked in with said generator, a phase shifter through which said submultiple wave is passed to produce a second wave that is adjustable in phase or timing, and means comprising a pulse selector tube to which said first and second adjustable waves are applied for passing only the portions of said first adjustable wave that exceed a certain amplitude and that occur simultaneously with portions of said second adjustable wave that exceed a certain amplitude.

10. Apparatus for producing a periodically recurring electrical pulse that is adjustable in phase or timing, said apparatus comprising a generator for producing a periodic electrical wave, a phase shifter through which said wave is passed to produce a periodic electrical wave that is adjustable in phase or timing, frequency divider means for producing a second periodic electrical wave having a frequency that is a submultiple of the frequency of said first wave, said frequency divider means being connected to receive said first wave from said generator whereby it is locked in with said generator, a phase shifter through which said submultiple wave is passed to produce a second wave that is adjustable in phase or timing, means for converting said submultiple wave to electrical pulses of short duration as compared with their repetition period, and means comprising a pulse selector tube to which said first adjustable wave and said submultiple frequency pulses are applied for passing only the portions of said first adjustable wave that occur simultaneously with each of said pulses.

11. Apparatus for producing pulses having a repetition period that is long compared with the duration of each pulse, said pulses being adjustable in phase or timing, said apparatus comprising a master oscillator and a chain of frequency dividers connected thereto whereby each divider supplies a signal having a frequency or repetition rate that is a submultiple of that of the signal applied to it, means for converting the output signals of said dividers into periodically recurring pulses with each group of recurring pulses having a repetition period that is long compared with the duration of each pulse of the group and with each group of pulses adjustable in phase or timing, said last means including a plurality of phase shifters, there being one phase shifter for each group of pulses, selector means for passing a signal only in response to a plurality of pulses or signal of predetermined amplitude being applied simultaneously thereto, and means for applying said master oscillator signal and said groups of pulses to said selector means whereby pulses of said master oscillator signal appear as its output pulses.

12. Apparatus for producing pulses having a repetition period that is long compared with the duration of each pulse, said pulses being adjustable in phase or timing, said apparatus comprising a master oscillator and a chain of frequency dividers connected thereto whereby each divider supplies a signal having a frequency or repetition rate that is a submultiple of that of the signal applied to it, means for converting the output signals of said master oscillator and of said dividers into periodically recurring pulses with each group of recurring pulses having a repetition period that is long compared with the duration of each pulse of the group and with each group of pulses adjustable in phase or timing, said last means including a plurality of phase shifters, there being one phase shifter for each group of pulses, selector means for passing a signal only in response to a plurality of pulses being applied simultaneously thereto, and means for applying said groups of pulses to said selector means whereby the desired pulses may be made to appear as its output pulses.

References Cited in the file of this patent

UNITED STATES PATENTS

| Number | Name | Date |
|---|---|---|
| 1,894,079 | Barz | Jan. 10, 1933 |
| 2,048,081 | Riggs | July 21, 1936 |
| 2,171,536 | Bingley | Sept. 5, 1939 |

FOREIGN PATENTS

| Number | Country | Date |
|---|---|---|
| 510,881 | Great Britain | Aug. 8, 1939 |